United States Patent

Colgan

[19]

[11] 3,913,257

[45] Oct. 21, 1975

[54] FISH LURE WITH EXCHANGEABLE SIDE PANELS

[75] Inventor: Francis L. Colgan, Binghamton, N.Y.

[73] Assignee: Raymond Lee Organization Inc., a part interest

[22] Filed: Nov. 20, 1974

[21] Appl. No.: 525,300

[52] U.S. Cl.................................. 43/42.09; 43/42.09
[51] Int. Cl.² ........................................... A01K 85/00
[58] Field of Search .................................... 43/42.09

[56] References Cited
UNITED STATES PATENTS

| | | | |
|---|---|---|---|
| 810,017 | 1/1906 | Ackerman | 43/42.09 |
| 1,568,325 | 1/1926 | Dewey | 43/42.09 |
| 2,593,220 | 4/1952 | Thompson et al. | 43/42.09 |
| 2,618,096 | 11/1952 | Wagner | 43/42.09 X |

Primary Examiner—Hugh R. Chamblee
Assistant Examiner—Daniel J. Leach

[57] ABSTRACT

A flat center plate is sandwiched between two body panels which are mirror images of each other. The panels are each shaped with one flat surface and one outwardly curving convex surface and have peripheries so shaped as to approximate the outline of the body of a fish. When the center plate is placed between the flat surfaces of the panels, the assembly takes on the general shape of the body of a fish. The panels are detachably secured to the plate by means, allowing panels of different appearances to be used, thus simulating the appearance of different bait fish. Hooks are attached to the periphery of the center plate and project outwardly therefrom to catch fish attracted to the lure.

4 Claims, 2 Drawing Figures

FISH LURE WITH EXCHANGEABLE SIDE PANELS

SUMMARY OF THE INVENTION

The object of the invention is to provide a fish lure that can be used to simulate the appearance of a plurality of different bait fish, to enable the user to select that particular appearance which will attract the game fish of his choice.

Thus, a flat center plate has means to detachably secure two body panels to its sides. The body panels are mirror images of each other and each has a flat surface touching the plate, and a convex surface curving outwardly therefrom. When the panels are secured to the plate, the whole assembly takes on the appearance of a fish. Hooks are attached to the periphery of the plate and extend outwardly therefrom, to hook fish that are attracted by the lure. When the user desires to change the appearance of the lure, the panels may be detached, and different ones attached to the plate.

DETAILED DESCRIPTION OF PREFERRED EMBODIMENTS

Figure 1:
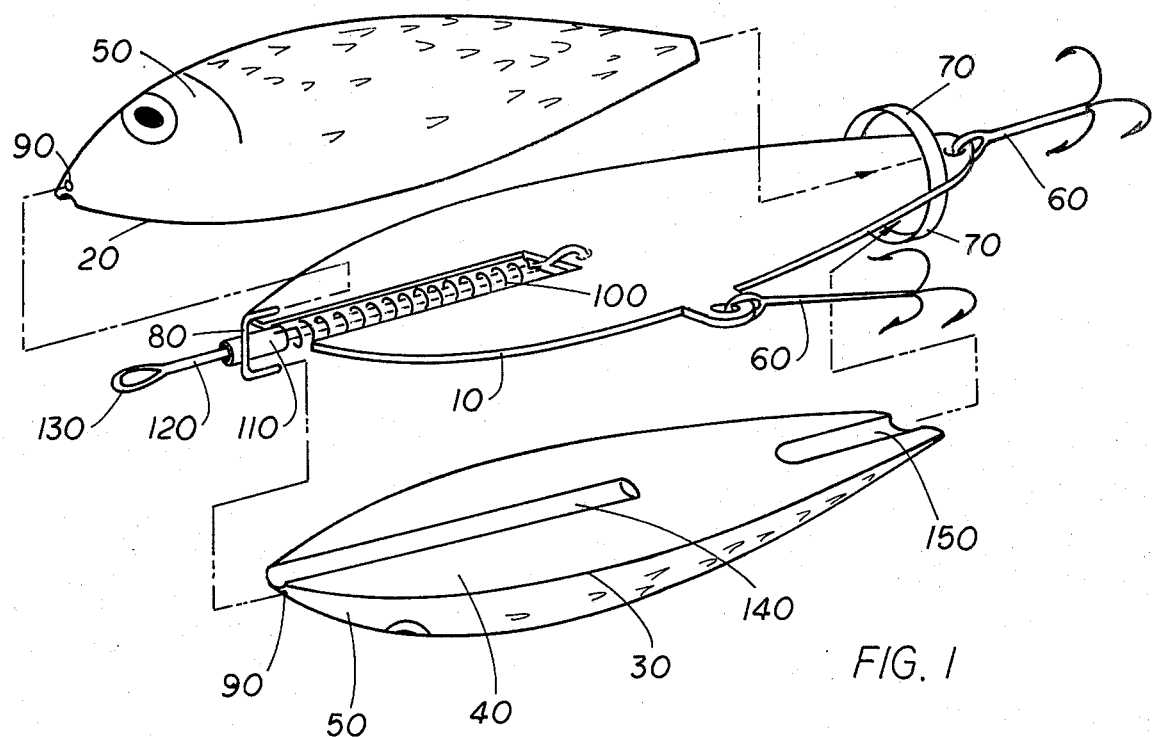
FIG. 1 shows the invention in an exploded drawing.

FIG. 1 shows a center plate 10 sandwiched between a left body panel 20 and a right body panel 30. Each of the panels is a mirror image of the other, having a periphery approximating the outline of the body of a fish, and having a flat surface 40 adjacent the plate and an outwardly curving convex surface 50.

The panels are detachably secured on both sides of the flat center plate, which has a periphery generally similar to the peripheries of the panels. Hooks 60 are attached to the rear and bottom of the plate near its periphery and extend outwardly therefrom.

To detachably secure the panels to the plate, two like bands 70 are attached to the rear of the plate to encircle the curved surfaces of the body panels and thus urge the panels against it. In addition, U-shaped pin 80 engages holes 90 in the panels and is kept therein by a tension spring 100 attached to the plate at its rearward end. The pin is affixed to a cylindrical member 110. Member 110 has an axial bore that rides on an elongated rod 120 with a loop 130 on its forward end. The rod is attached to the plate at its rearward end and encircled by the spring, which is in turn attached to the member 110. To accommodate the spring and rod, grooves 140 are cut into the flat surfaces of the body panels. Like grooves 150 are cut into the flat surfaces of the panels to accommodate the rear hook.

Figure 2:
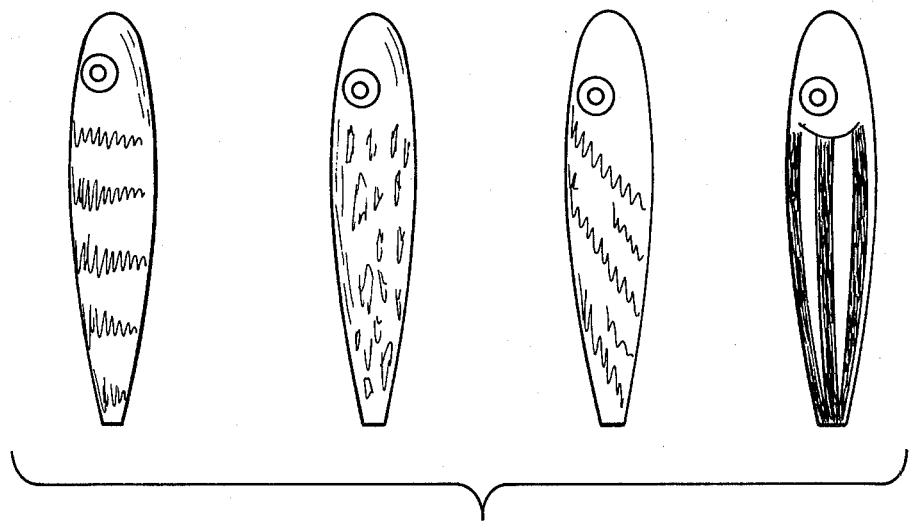
FIG. 2 shows various right body panels for use in the invention.

A fish line may be attached to the loop 130, when the lure is to be used. Different panels, such as those shown in FIG. 2, may be secured to the plate by moving the member 110 forwardly, lifting off the body panels attached to the plate, substituting other panels in proper position, and allowing the spring to pull the pins into the holes in the panels, causing the panels to be held in place.

While the invention has been described with detailed reference to the drawings, the protection sought is to be limited only by the terms of the claims which follow.

I claim:

1. A fish lure which can be used to simulate the appearance of a plurality of bait fish comprising:

a flat elongated center plate bearing fishhooks extending outwardly from its periphery away from the center of the plate;

a plurality of left body panels, each left panel having a flat surface and an outwardly curving convex surface, each left panel having a periphery approximating the outline of the body of a fish;

a like plurality of right body panels, each right body panel taking the form of a mirror image of a corresponding left body panel; and means disposal on the center plate and cooperating with a left body panel and its corresponding right body panel and detachably securing the panels to the plate in a manner that the plate is sandwiched between the flat surfaces of the plates to form a structure simulated the appearance of the body of a fish with fishhooks extending outwardly therefrom, said means including two like opposed bands disposed on opposite sides of the plate near its rearmost extremity, each band encircling the rear portion of one of the body panels and thus keeping it pressed against the plate.

2. The device of claim 1 wherein the means further includes a U-shaped pin that engages holes in the front of the body panels and that is urged rearwardly by a spring attached to the center plate.

3. The device of claim 1 wherein the means is further characterized by an elongated rod disposed inside the axial bore of a hollow cylinder upon which the pins are disposed, the rod being attached to the plate at its rearward end and being encircled by the spring.

4. The device of claim 3 wherein the forward end of the rod terminates in a loop.

* * * * *